United States Patent
Yu et al.

(10) Patent No.: US 7,852,192 B2
(45) Date of Patent: Dec. 14, 2010

(54) PROTECTIVE CIRCUIT BOARD AND OVERCURRENT PROTECTION DEVICE THEREOF

(75) Inventors: Ching Han Yu, Fonglin Township (TW); David Shau Chew Wang, Taipei (TW); Pao Hsuan Chen, Taoyuan (TW)

(73) Assignee: Polytronics Technology Corporation, Hsinchu (TW)

( * ) Notice: Subject to any disclaimer, the term of this patent is extended or adjusted under 35 U.S.C. 154(b) by 692 days.

(21) Appl. No.: 11/923,741

(22) Filed: Oct. 25, 2007

(65) Prior Publication Data

US 2008/0253050 A1    Oct. 16, 2008

(30) Foreign Application Priority Data

Apr. 16, 2007    (TW) ............................... 96113283 A

(51) Int. Cl.
*H01C 7/10* (2006.01)
(52) U.S. Cl. ...................... 338/22 R; 338/315; 361/634
(58) Field of Classification Search ............... 338/22 R, 338/25, 220, 185, 315; 429/61, 62; 361/634, 361/679
See application file for complete search history.

(56) References Cited

U.S. PATENT DOCUMENTS

| | | | | |
|---|---|---|---|---|
| 4,924,204 A | * | 5/1990 | Uchida | ............... 338/22 R |
| 5,068,637 A | * | 11/1991 | Bayer | ............... 338/57 |
| 5,691,688 A | * | 11/1997 | West et al. | ............... 338/22 R |
| 6,396,383 B1 | * | 5/2002 | Glatz-Reichenbach et al. | ............... 338/22 R |
| 6,713,210 B1 | | 3/2004 | Sato et al. | |
| 7,367,114 B2 | * | 5/2008 | Rybka et al. | ............... 29/623 |

* cited by examiner

*Primary Examiner*—Kyung Lee
(74) *Attorney, Agent, or Firm*—Connolly Bove Lodge & Hutz LLP

(57) ABSTRACT

The over-current protection device of the present invention can be used for over-current protection to PCM. The over-current protection device comprises a PTC device, at least one insulation layer; at least one electrode layer and at least one conductive channel. The insulation layer is placed on a surface of the PTC device, and the electrode layer is formed on the insulation layer afterwards. As a result, the insulation layer is between the electrode layer and the PTC device. The electrode layer serves as a surface of the over-current protection device. The conductive channel electrically connects the PTC device and the electrode layer. In an embodiment, the conductive channel is a blind hole penetrating through the electrode layer and the insulation layer and ending at the surface of the PTC device, and the surface of the blind hole is coated with a conductive layer to electrically connect the PTC device and the electrode layer.

16 Claims, 3 Drawing Sheets

PROTECTIVE CIRCUIT BOARD AND OVERCURRENT PROTECTION DEVICE THEREOF

BACKGROUND OF THE INVENTION (A) Field of the Invention

The present invention relates to a protective circuit board and the over-current protection device thereof.

(B) Description of the Related Art

Because the resistance of conductive materials having a positive temperature coefficient (PTC) characteristic is very sensitive to temperature variation, such materials can be used for current sensing devices, and have been widely applied to over-current protection devices or circuit devices. The resistance of PTC conductive material remains extremely low at normal temperature, so that the circuit or cell can operate normally. However, when an over-current or an over-temperature event occurs in the circuit or cell, the resistance will instantaneously increase to a high resistance state (e.g. at least above $10^4$ ohms), which is the so-called trip. Therefore, the over-current will be eliminated so as to protect the cell or the circuit device.

U.S. Pat. No. 6,713,210 disclosed a circuit board with over-current protection function. As shown in FIG. 1, an IC device 2 is placed on a protective circuit module (PCM) 1, and a PTC device 3 is surface-mounted on the PCM 1. The PTC device 3 is a stack structure in which a PTC material layer 6 is laminated between nickel foils (or copper foils electroplated with nickel) 7 and 7'. The nickel foils 7 and 7' serve as electrodes for the PTC material layer 6. A nickel plate 4 serving as an external electrode is secured on the upper surface of the nickel foil 7, and a copper electrode 5 is soldered to the lower surface of the nickel foil 7' that is adjacent to the surface of the PCM 1. The nickel plate 4 and the copper plate 5 are symmetrical with reference to the PTC device 3.

In consideration of high voltage and high current in spot-welding, the PTC device 3 cannot be subjected to spot-welding directly, and needs to be first combined with a nickel plate 4 of a thickness preferably greater than 0.3 mm, so as to avoid damage to the nickel foils 7 and 7' of the PTC device 3 while spot-welding. However, the nickel plate 4 is usually attached to the PTC device 3 manually, which is detrimental to mass production and cost reduction.

SUMMARY OF THE INVENTION

The present invention provides a protective circuit board and an over-current protection device, which can be applied to a PCM for a battery. The over-current protection device can be combined with the PCM or an external electrode plate by spot-welding, so as to facilitate mass production and therefore significantly reduce manufacturing time and cost.

The over-current protection device of the present invention can be used for over-current protection for a PCM. The over-current protection device comprises a PTC device, at least one insulation layer, at least one electrode layer and at least one conductive channel. The PTC device comprises a PTC material layer and two metal electrode foils on the upper and lower surfaces of the PTC material layer. The insulation layer is placed on a surface of the PTC device, and the electrode layer is formed on the insulation layer afterwards. As a result, the insulation layer is between the electrode layer and the PTC device. The electrode layer serves as a surface of the over-current protection device. The PTC device, the insulation layers and the electrode layers form a stack structure. The conductive channel electrically connects the PTC device and the electrode layer. In an embodiment, the conductive channel is a blind hole penetrating through the electrode layer and the insulation layer and ending at the surface of the PTC device, and the surface of the blind hole is coated with a conductive layer for electrically connecting the PTC device and the electrode layer.

The over-current protection device of the present invention can be subjected to spot-welding directly, so that it is not necessary to manually attach an electrode plate to the PTC device as required in the prior art, which makes the present invention more suitable for mass production. Therefore, the process can be simplified, the manufacture efficiency can be increased, and the over-current protection device is very flexible for subsequent manufacturing process.

A known Surface Mount Device (SMD) has two electrode terminals on the same plane, and an insulation layer separates the two electrode terminals on left and right sides. Therefore, the two electrode terminals can be secured on a printed circuit board by soldering reflow. The design of the over-current protection device of the present invention is different from that of the known device of SMD type, and the two electrode terminals of the device of the present invention are on the upper and lower surfaces of the device. Because the two electrode terminals are not on the same plane, the lower electrode terminal can be soldered to the PCM board but the upper electrode terminal cannot be soldered to the PCM board at the same time. The upper electrode terminal is on top of the device; therefore the upper electrode terminal can be connected to the other metal electrode plate by spot-welding.

Moreover, the over-current protection device can be secured to a surface of a PCM to form a protective circuit board with over-current protection function, which is very useful for manufacturing.

DETAILED DESCRIPTION OF THE INVENTION

Figure 1:
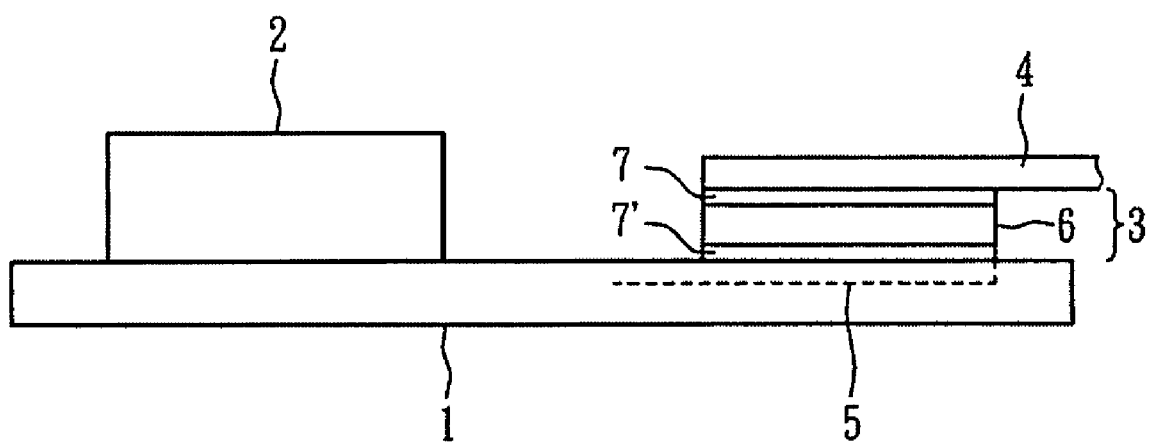
FIG. 1 illustrates a known application of an over-current protection device to PCM.
Figure 2:
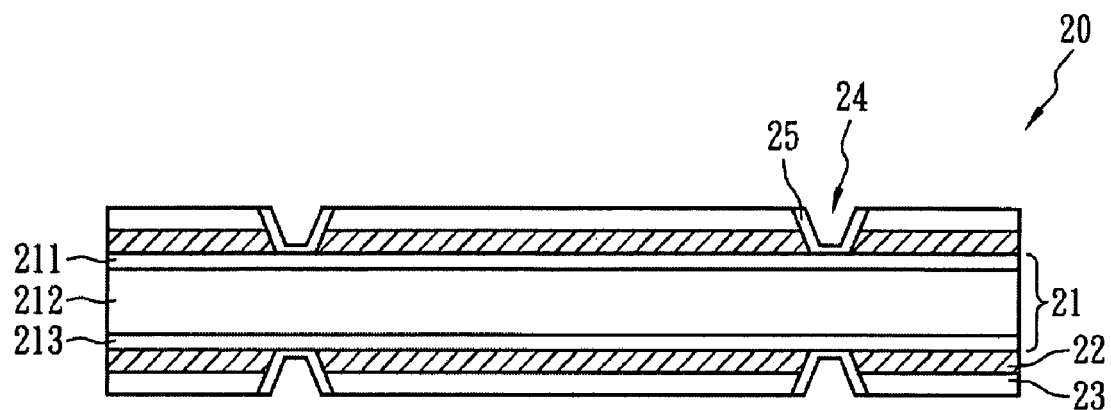
FIG. 2 illustrates an over-current protection device in accordance with an embodiment of the present invention.

FIG. 2 illustrates an over-current protection device in accordance with an embodiment of the present invention. An over-current protection device 20 comprises a PTC device 21, insulation layers 22 and electrode layers 23. The PTC device 21 is a stack structure in which a PTC material layer 212 is laminated between metal electrode foils 211 and 213. The thickness of the metal electrode foil 211 or 213 is between 0.025 and 0.5 mm. The PTC material layer 212 comprises a crystalline polymer material mixed with conductive fillers. The insulation layers 22 and the electrode layers 23 are disposed on two sides of the PTC device 21. The insulation layers 22 are disposed on the surfaces of the PTC device 21, and electrode layers 23 are disposed on insulation layers 22. The thickness of the electrode layer 23 is between 0.025 and 0.5 mm.

When the PTC device 21, the insulation layers 22 and electrode layers 23 are combined, blind holes 24 penetrating through the electrode layers 23 and the insulation layers 22, and ending at the surface of the metal electrode foils 211 and 213 of the PTC device 21, are formed by laser drilling or mechanical drilling. The surfaces of the blind holes 24 are conductive layers 25 formed by, for example, electroplating, so as to create a conductive channel electrically connecting the PTC device 21 and the electrode layers 23.

The insulation layers 22 can be composed of polypropylene (PP), glass fiber (e.g., FR4), or epoxy. In order to increase heat conductivity, the insulation layers 22 can also include heat conductive fillers, e.g., aluminum oxide ($Al_2O_3$), boron nitride (BN) or aluminum nitride (AlN). Accordingly, the PTC device 21 can sense temperature more sensitively. Preferably, the heat conductivity coefficient of the insulation layer 22 is greater than 1 W/m-K. The surfaces of the electrode layers 23 can be subjected to chemical gold treatment (Ni—Au), so as to facilitate the subsequent tin paste (solder) attachment or spot-welding.

Figure 3:
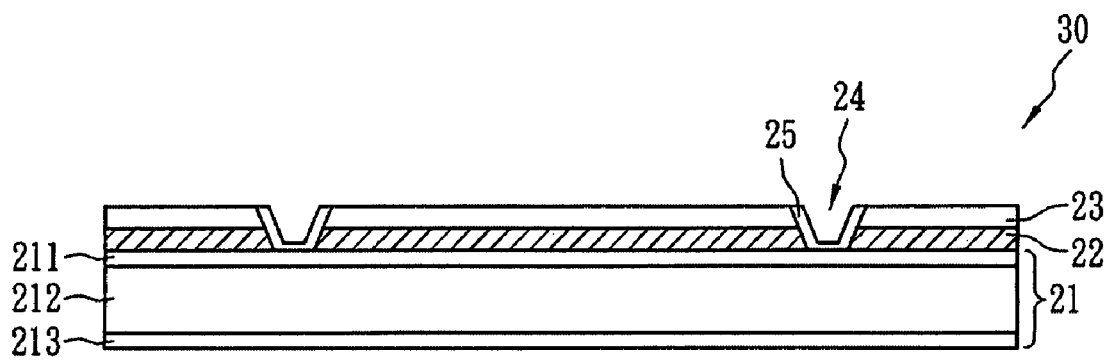
FIG. 3 illustrates an over-current protection device in accordance with another embodiment of the present invention.

FIG. 3 illustrates an over-current protection device 30 in accordance another embodiment of the present invention. In comparison with FIG. 2, the insulation layer 22 and the electrode layer 23 are formed on one side of the PTC device 21 only.

Figure 4:
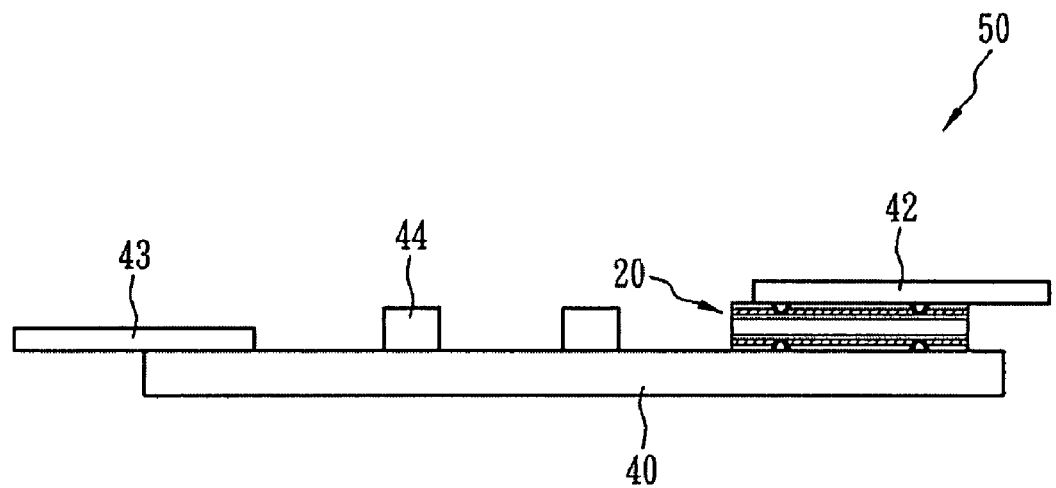
FIG. 4 illustrates an embodiment of an over-current protection device applied to a PCM in accordance with the present invention.
Figure 5:
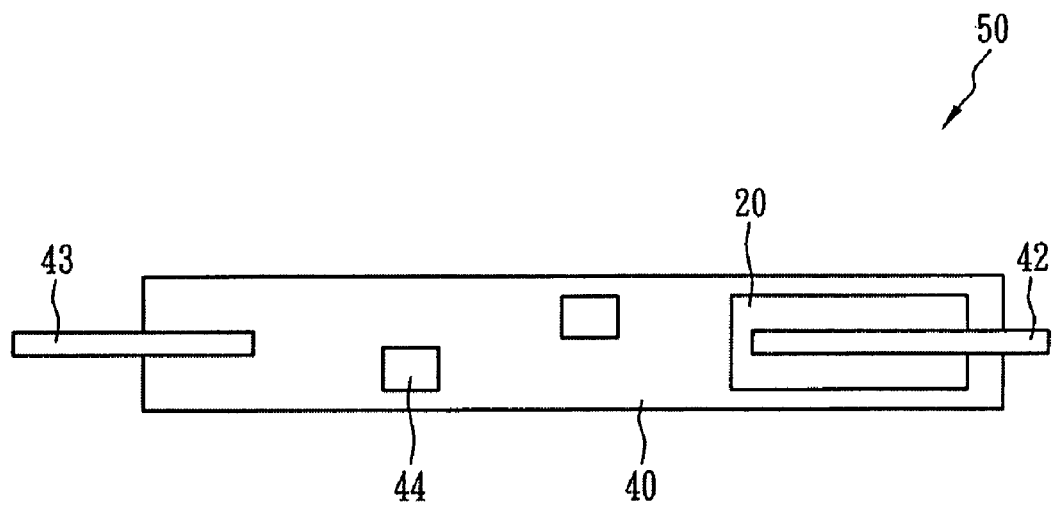
FIG. 5 is a top view of FIG. 4.

FIG. 4 illustrates an embodiment of an over-current protection device applied to a PCM in accordance with the present invention, and FIG. 5 is the top view of the over-current protection device and the PCM shown in FIG 4. A side of the over-current protection device 20 of FIG. 2 can be secured on a surface of a PCM 40 including electronic devices 44 by spot-welding or surface mount technology, and another side of the over-current protection device 20 is spot-welded on an electrode plate 42 serving as an external electrode. The surface of the PCM 40 is soldered with another electrode plate 43 as another external electrode. Accordingly, a protective circuit board 50 with over-current protection function is formed. The electrode plates 42 and 43 can be connected to an electrical power source, and electrically connected to the upper and lower electrode layers 23, respectively, which are on two sides of the PTC device 21, so as to form a loop.

Because high voltage and high current are required for spot-welding, the above-mentioned traditional PTC device needs to be equipped with thick electrode plates. The over-current protection device of the present invention has insulation layers between the PTC device and the electrode layers, so that the electrode layers can be subjected to spot-welding directly without causing damage to the PTC device. In an embodiment, the thickness of the external electrode is only 0.127 mm if it is a nickel plate, and is around 0.035 mm in the case of a copper plate.

Because both sides of the PTC device of the over-current protection device 20 of FIG. 2 are equipped with insulation layers, the two sides can be in connection with the PCM and the external electrode. In practice, manufacture becomes more flexible in accordance with the present invention. For example, surface mount technology can also be used for attachment, and the over-current protection device 20 or 30 can be subjected to spot-welding directly, or attached to an electrode plate before spot-welding.

Because the PTC device of the over-current protection device 30 of FIG. 3 has only one side with an insulation layer, the side without the insulation layer or electrode layer can be surface-mounted to the PCM, and another side can be attached to the external electrode plate by spot-welding. The upper and lower metal electrodes of the over-current protection device 30 can be connected to positive and negative terminals of a electrical power source, respectively, to form a circuitry, i.e., one terminal of the power source is electrically connected to the upper electrode layer 23 and the other terminal is electrically connected to the lower metal electrode foil 213 of the device 30; thereby the over-current protection device 30 is connected in series in the circuitry.

If a traditional PTC device is going to be combined with a metal electrode plate, e.g., a nickel plate, the method of tin-paste soldering reflow will be used because spot-welding cannot be used directly. However, the temperature of reflow is greater than 230° C., resulting in a significant increase in the resistance of the PTC device, and resistance recovery of the PTC device will be impacted. Due to the protection from the insulation layer, the over-current protection device of the present invention can be connected to the nickel lead via spot-welding process and the PTC material layer will not be subjected to high temperatures. Accordingly, the resistance of the PTC device will not increase significantly and can remain stable. Therefore, in accordance with the present invention, the PTC device can be combined with metal electrode plates by spot-welding, so that the resistance and recovery of the PTC device will not be impacted.

Moreover, in cases where the PTC device is secured to a PCM board, the PTC device usually undergoes soldering reflow process. Because the high temperature of the soldering reflow process will trip the PTC device, the resistance recovery is an important index to verify whether the PTC device is qualified. In an embodiment, thirty traditional over-current protection devices and thirty over-current protection devices of the present invention are selected and subjected to electrical testing. They are subjected to soldering reflow at 250° C., and their resistances are measured after recovery from the trip. The ratio $R_{jump}$ of the final resistance after recovery to the initial resistance ($R_{final}/R_{initial}$) for a traditional over-current protection device is 2.42, whereas $R_{jump}$ of the over-current protection device of the present invention is 2.18. It is obvious that the over-current protection device of the present invention has better performance on resistance recovery after trip.

The above-described embodiments of the present invention are intended to be illustrative only. Numerous alternative embodiments may be devised by those skilled in the art without departing from the scope of the following claims.

What is claimed is:

1. An over-current protection device, comprising:
   a positive temperature coefficient (PTC) device, comprising a PTC material layer and two metal electrode foils on an upper surface and a lower surface of the PTC material layer;
   at least one insulation layer placed on a surface of the PTC device;
   at least one electrode layer placed on a surface of the insulation layer, the insulation layer being between the electrode layer and the PTC device and serving as a surface of the over-current protection device; and
   at least one conductive channel electrically connecting the PTC device and the electrode layer and comprising:
      at least one blind hole penetrating through the electrode layer and the insulation layer and ending at a surface of the PTC device; and
      at least one conductive layer on a surface of the blind hole and being configured to electrically connect the PTC device and the electrode layer;
   wherein the PTC device, the insulation layer and the electrode layer form a stack structure.

2. The over-current protection device of claim 1, wherein the blind hole is formed by laser drilling.

3. The over-current protection device of claim 1, wherein both upper and lower surfaces of the PTC device are stacked with the insulation layers and the electrode layers.

4. The over-current protection device of claim 1, being secured to a surface of a protective circuit module (PCM).

5. The over-current protection device of claim 1, wherein the electrode layer has a thickness between 0.025 and 0.5 mm.

6. The over-current protection device of claim 1, wherein the electrode layer is attached to an external electrode plate by spot-welding.

7. The over-current protection device of claim 1, wherein the PTC material layer comprises a crystalline polymer material mixed with conductive fillers.

8. The over-current protection device of claim 1, wherein the metal electrode foil has a thickness between 0.025 and 0.5 mm.

9. The over-current protection device of claim 1, wherein the insulation layer is made of polypropylene, glass fiber or epoxy.

10. The over-current protection device of claim 1, wherein the insulation layer has a heat conductivity coefficient greater than 1 W/m-K.

11. The over-current protection device of claim 1, wherein the insulation layer comprises heat conductive fillers.

12. The over-current protection device of claim 11, wherein the heat conductive fillers are selected from the group consisting of aluminum oxide,. boron nitride or aluminum nitride.

13. A protective circuit board, comprising:
a protective circuit module (PCM); and
the over-current protection device of claim 1 being placed on a surface of the PCM.

14. The protective circuit board of claim 13, wherein the electrode layer of the over-current protection device has a thickness between 0.025 and 0.5 mm.

15. The protective circuit board of claim 13, further comprising an electrode plate spot-welded on a surface of the electrode layer of the over-current protection device.

16. The protective circuit board of claim 13, wherein the insulation layer of the over-current protection device is made of polypropylene, glass fiber or epoxy.

* * * * *